United States Patent [19]

Fusayama et al.

[11] 3,801,368

[45] Apr. 2, 1974

[54] PROCESS OF ELECTROLESS PLATING AND ARTICLE MADE THEREBY

[75] Inventors: Takeo Fusayama; Kenji Hayashi; Yoshio Asamizu; Meitaro Endo; Yasuo Shinohara, all of Otsu, Japan

[73] Assignee: Toray Industries, Inc., Tokyo, Japan

[22] Filed: Nov. 23, 1971

[21] Appl. No.: 201,538

[30] Foreign Application Priority Data

Nov. 25, 1970 Japan ............................ 45-113308

Dec. 24, 1970 Japan ............................ 45-116792

[52] U.S. Cl. ........... 117/239, 117/71 R, 117/130 E, 204/192, 204/38 R

[51] Int. Cl. ............................................ C23c 15/00

[58] Field of Search ....... 117/47 R, 50, 71 R, 71 M, 117/130 E, 236, 239, 240; 204/38 S, 192

[56] References Cited

UNITED STATES PATENTS

| | | | |
|---|---|---|---|
| 3,350,180 | 10/1967 | Croll | 117/236 X |
| 2,995,475 | 8/1961 | Sharpless | 204/38 S X |
| 3,150,939 | 9/1964 | Wenner | 117/71 R X |
| 3,370,979 | 2/1968 | Schmeckenbecher | 106/1 X |
| 3,431,120 | 3/1969 | Weisenberger | 117/71 R X |

FOREIGN PATENTS OR APPLICATIONS

| | | | |
|---|---|---|---|
| 1,010,905 | 6/1957 | Germany | 117/71 R |

OTHER PUBLICATIONS

Snyder, K. A. et al., IBM Technical Disclosure Bulletin, Vol. 7, No. 9, February 1965, p. 740.

Geldermans, P. et al., IBM Technical Disclosure Bulletin, Vol. 9, No. 10, p. 1403, March 1967.

*Primary Examiner*—Ralph S. Kendall

[57] ABSTRACT

An electroless plating method is provided in which palladium or gold is deposited on a substrate in vacuo and thereafter the substrate is electrolessly plated using the previously deposited palladium or gold as the catalyst.

5 Claims, No Drawings

PROCESS OF ELECTROLESS PLATING AND ARTICLE MADE THEREBY

BACKGROUND OF THE INVENTION

1. Field of the Invention

This invention is concerned with a novel method of electroless plating, and with the articles produced thereby.

2. Description of the Prior Art

Heretofore electroless plating of a substrate was conducted by rinsing the substrate with water or (and) organic solvent and removing the grease and other soil therefrom; chemically etching the substrate; rinsing the substrate with water; sensitizing the substrate; rinsing the substrate with water; activating the substrate; rinsing the substrate with water; thereafter electrolessly plating the substrate in an electroless plating liquid; rinsing the plated substrate with water and then drying the substrate. The above described process had many disadvantages. The steps were very time consuming and the reaction conditions were complicated, highly sensitive and difficult to control. This was especially true when attempts were made to continuously electrolessly plate long films or sheets of material because of migration of the plating reactants from one process bath to another. The migration of the reactants destroyed the balance of the reactants in each of the process baths. This was especially troublesome if the sensitizing liquid reactant migrated to the bath containing the activating liquid reactant, or if the activating liquid reactant migrated into the plating liquid, in that, it considerably shortened the chemical life of the reactants.

A further problem of the above described prior art process was that the surface of the substrate had to initially be roughened by chemical etching in order to have a satisfactory coating. As a result, the plated surface was not smooth and lustrous. This roughness was especially troublesome if magnetic recording tapes or magnetic record sheets were produced utilizing the prior art electroless plating method. The magnetic metal which was plated on the roughened chemically etched substrate did not have a smooth surface configuration. Accordingly, magnetic recording heads did not uniformly contact the plated surfaces due to the inherent non-uniformity of the surface. As a result, there were considerable fluctuations in the sensitivity and output which adversely effected the reproducibility of magnetic recordings made from these tapes and records.

If, however, the chemical etching treatment was omitted, the sensitizing liquid and the activating liquid would not uniformly adhere to the substrate, especially during the activation step. Accordingly, during the electroless plating step, the metal did not strongly adhere to the substrate and the plating varied considerably in thickness.

It is accordingly an object of this invention to overcome the aforementioned problems and difficulties encountered with the prior art method.

It is a still further object of this invention to provide an improved method of electrolessly plating a substrate so as to provide a smooth, uniform coating having excellent adhesion.

It is a still further object of this invention to provide a plated article by an electroless plating method, which has a smooth lustrous surface and a uniform thickness of plating applied thereto, and also to provide a simplified pre-treatment before electroless plating.

Other objects and advantages of this invention, it will become further apparent hereinafter, from a continued reading of the specification and subjoined claims.

BRIEF SUMMARY OF THE INVENTION

The objects of this invention have been achieved by providing a method wherein palladium or gold is deposited on a substrate to be plated in vacuo, more particularly, by vacuum evaporation or sputtering, and the substrate is thereafter electroless plated using the palladium or gold as the plating catalyst.

DESCRIPTION OF THE PREFERRED EMBODIMENTS

The deposition of the palladium or gold onto the substrate is conducted in vacuo by either vacuum evaporation or sputtering of the metal onto the substrate. When the vacuum evaporation method is adopted, it is advisable to make the amount of vacuum inside the vacuum chamber higher than $10^{-2}$ Torr and preferably $10^{-4}$ to $10^{-5}$ Torr. Electric resistance heating, RF induction heating and electron bombardment heating can be used to heat the metal. The palladium and gold are melted in the vacuum and thereafter are evaporated as fine particles which adhere to the substrate. It is preferable to so place the substrate to be plated in a position so as to directly confront the metal being evaporated. In order to carry out continuous evaporation onto a film or the like, the substrate which is to be plated is continuously advanced over the source of evaporated metal.

When sputtering is employed, it is preferable to include in the vacuum chamber a very small amount of a gas such as argon, with the vacuum in the chamber being about $10^{-1}$ to $10^{-3}$ Torr. Sputtering of palladium and gold onto a substrate is carried out using various known methods of sputtering. As gases to be enclosed, besides argon, there can be employed inert gases such as Ne, Xe, and Kr. However, even when $N_2$, $H_2$, $O_2$ and air are used the sputtering effect is not decreased. DC diode sputtering, triode sputtering (making filaments a thermionic cathode), a plasma sputtering (tetraode sputtering), RF sputtering (including a DC pile up) and ion sputtering can be used as the sputtering methods. However, the sputtering methods are not necessarily limited to the above named methods. The substrate may be positioned as one of the electrode or positioned on the electrode which is opposed to the target or positioned at a place, where it can receive the metal (Pd, Au) scattered from the target. Because of the effect of the process of the present invention is obtained with the deposit of very small amounts of gold and palladium, the process is generally not used for deposition of thick film within a short period of time. When it is attempted to deposit a thick film, excessive elevation of the temperature of the substrate is often encountered. Because the sputtering method gives deposits of a relatively thinner film, which are effective for the electroless plating method, it is superior to the vacuum evaporation method.

Generally, even when the average adhered amount of palladium or gold on the substrate is very small, it still exhibits a catalytic activity for electroless plating. The effective amount of palladium is from 0.05–200 mg/m² of the substrate and preferably 0.5 to 200 mg/m$^2$. When the amount is less than 0.05 mg/m$^2$ the effect of the catalytic activity is not obtained.

When gold is used the average adhered amount should be 50 mg/m$^2$–4 g/m$^2$ of the substrate and preferably 90 mg/m$^2$–4 g/m$^2$. When the amount is less than 50 mg/m$^2$, the desired catalytic activity is not obtained.

The upper limits of the adhered amounts of palladium and gold are, because both of them are expensive metals, limited from the economic standpoint, and are different depending upon the conditions of the electroless plating employed. However, the upper limit is generally the amount at which the metals become integral with the plated film deposited and brittle with the adhesion being decreased thereby.

Although the metals used need not be pure, the higher the purity the larger will become the effect. It goes without saying that it is necessary that any impurities that are simultaneously evaporated should not act as a catalyst poison.

The average deposited and adhered amount as herein referred to is obtained by quantitatively analyzing the palladium and gold adhered to the substrate and converting the obtained weight to that per unit area (m$^2$) of the substrate. When the adhered amount is very small, said quantitative analysis may be carried out by radioactivation analysis and fluorescent X-ray analysis. If the amount if larger it may be found by colorimetric analysis and polarography.

When depositing these metals, other metals and nonmetals may be deposited simultaneously. However, the mode must be such that the said amount of palladium or gold is substantially exposed on the surface of the substrate. Other metals can also be deposited by vacuum evaporation or sputtering as a pretreatment before application of the palladium or gold. For example, it is possible to deposit a metal, which can be automatically plated by means of galvanic initiation, simultaneously or in advance by vacuum evaporation or sputtering. It is also possible to precoat the substrate with such a substance that will increase the adhesion of palladium and gold, and increase the rate of electroless plating.

The substrates which can be plated by the electroless method of this invention can be made of an organic, inorganic, or composite inorganic and organic material, and can be electrically non-conductive, semiconductive or conductive. The outer surface of the substrate which is to be actually plated may be comprised of a different material than the main portion of the substrate. Such a material is obtained by coating the substrate with another material which can be an organic, inorganic, or a composite material and likewise, can be electrically non-conductive, semi-conductive, or conductive in character.

Since the method of this invention is an electroless plating method it is especially useful for plating the surfaces of organic substances which are inherently electrically non-conductive, especially the surfaces of articles made of synthetic resins. As such, synthetic resins, there can be mentioned, for example, polyesters such as polyethyleneterephthalate, polycarbonates, polyolefins, cellulose acetate, polyamides, polyvinyl chloride, polystyrene, ABS, polyimide, epoxy resins and polyurethane resins. It should be appreciated, however, that the substrate is not limited to the above noted synthetic resins, and other resins can likewise be plated in accordance with the method of this invention. The substrate can also be a composite material such as a material made of an organic resinous material and an inorganic filler, or it can be essentially inorganic in character, such as a composite composition made of glass and carbon fibers.

When the substrate is electrically conductive and especially when it is made of metal, electrolysis plating is generally employed. However, when it is not possible or difficult to use the substrate as an electrode, or when the electrical resistance value of the substrate is not suitable for electroplating, electro plating can not be satisfactorily employed. And, when the properties of the metal film, which can not be obtained except by electroless plating, is wanted on the electrically conductive layer, this invention can be effectively applied to this electrically conductive layer by vacuum deposition of palladium and gold before electroless plating.

Because the substrate used in the present invention is plated in an aqueous electroless plating bath, it is preferable in order to improve the adhesion of the plating film to the substrate to pretreat the surface of the substrate so as to make it more hydrophilic. In addition, conventional activation treatment can be employed as well as dust and soil removal treatment, corona discharge treatment, flame treatment, ion bombardment, plasma treatment, and also washing with acids or alkali. It should be noted that it is possible to carry out, for example, ion bombardment simultaneously within the same chamber where sputtering of palladium or gold is conducted, or within an adjacent chamber by continuously moving the substrate film between the chambers. It should be noted, however, that in contrast to the aforementioned conventional process in which the surface of the substrate had to be made hydrophilic, etched and roughened, in the process of the present invention, these steps can be omitted, especially etching of the surface of the substrate.

Surprisingly, the substrate on which palladium or gold is deposited in vacuo in accordance with the process of the present invention develops sufficient hydrophilic properties even when the substrate has not been pretreated to make the substrate hydrophilic even if the substrate is normally hydrophobic. Accordingly, the subsequent electroless plating can be carried out quite satisfactorily, which is a large reason why in the process of the present invention the conventional pretreatment, especially chemical etching can be omitted.

The advantages of the present invention greatly contribute to improving the smoothness of the final plated surface as noted above, and imparting a high luster to the plated film. These advantages make the magnetic metal electroless plated disc and tape very effective.

Because deposition of the palladium and gold used in the present invention is carried out by vacuum evaporation or sputtering, it is preferable that the materials be of a flat configuration, for example, in the form of a film, sheet or plate. However, the shape of the article which can be plated is not limited to these shapes. Other shaped articles can also be used when the surfaces to be deposited are properly positioned so as to receive the metal (Pd, Au) scattered from the target or crucible.

By placing a pattern-like mask over the substrate before depositing the palladium or gold on the substrate, a pattern of palladium or gold will be deposited on the substrate. Thereafter, when carrying out the electroless plating, it is possible to obtain a pattern-like plated film which can be utilized in a manner similar to a printed circuit, an optical mask and the like, as well as for decorative uses.

The most significant characteristics of the present invention reside in discovery that palladium and gold, per se, becomes catalyst for subsequent electroless plating by means of deposition on a substrate by either vacuum deposition or sputtering.

Furthermore, the form of the palladium or gold deposited in vacuo is distinctly different from the deposits of palladium and gold and even other precious metals, such as silver and platinum, when deposited on a substrate by chemical reduction of the metallic salt to the elemental metal. The catalytic activity of metals deposited by conventional chemical reduction methods have a catalytic activity of, at most, a few hours. This seriously limits the commercial feasibility of these processes using these metals. Palladium and gold deposited in vacuo, as taught in accordance with the process of the present invention, have extensive catalytic activity in the order of a few months and more. The reasons for the difference in catalytic activity is not known. In addition, of the metals which are conventionally used as catalysts for electroless plating, when deposited by the conventional chemical reduction processes, such as palladium, gold, silver and platinum, surprisingly only palladium and gold develop catalytic activity when deposited in vacuo in accordance with the present invention. Furthermore, the original palladium and gold plate for sputtering target (the thickness of which is, for example, 0.5 mm, 1.0 mm etc,) do not exhibit catalytic activity when immersed in the same electroless plating bath. Silver and platinum, even when deposited at various thicknesses by the same process do not exhibit any catalytic activity. This fact would appear to indicate that the shapes, structures and functional mechanisms of these metals in the nascent state when deposited by conventional chemical reduction methods are different from the metals deposited in accordance with the process of the present invention.

The advantage of the present invention is that it drastically simplifies the initial treatment of electroless plating process. In addition, it is possible, because of the increased catalytic activities to completely separate the step of the initial treatment and the final electroless coating process. It is possible to initiate electroless plating simply and continuously without difficulties. In addition, there is a further important advantage in that the transfer of the components from the initial baths to the plating bath as seen in the conventional processes, can be completely prevented, and control of the electroless plating becomes simplified. The deposited palladium or gold does not disperse into the plating bath to shorten the life of the plating bath by formation of granular metal precipitates in the plating liquid. This drastically reduces the formation of the pinholes in the plated film during the plating. It is preferable to use sputtering, because cleansing of the surface of the substrate is carried out simultaneously and the adhesion tends to be increased.

The compositions heretofore used for electroless plating of substrates can be used in the process of the present invention. There is no particular necessity to change the various conditions of plating, for example, the temperature and pH.

The plated film obtained by the process of the present invention may as mentioned above, be utilized for uses that are exactly the same as those of the conventional plated articles. However, the products of this invention are especially suitable for uses requiring materials substantially free of pinholes, having excellent surface smoothness and excellent adhesion of the plated material to the substrate. The plated articles are especially useful to make memory elements such as magnetic sheets, magnetic disks and magnetic tapes, as well as magnetic thin film memory element for integrated circuit, and printed circuit. Because the areas which are not plated have not been etched in the initial plating treatment, they have a large degree of transparency, and therefore, are good optical masks or can be used in decorative articles, for example, mirrors.

A further advantage of the process of the present invention is that only one side is plated with palladium or gold. Therefore, the process is effective where only one surface is desired to be plated, or when plating selective areas, as compared with conventional processes of electroless plating wherein all areas which are etched become hydrophilic and are plated, unless special masks are applied. When a tape is plated with magnetizable metal, the magnetizable plated layer is deposited only on one surface which is especially effective in preventing magnetic transcription on the tape.

The following examples are given by way of further illustration of the present invention and are not intended to limit the scope of the subjoined claims. All parts and percentages are parts and percentages by weight, not volume, unless otherwise noted.

EXAMPLE 1

A 100 mm wide by 200 m. long roll of biaxially drawn polyethylene terephthalate film (thickness 25 microns) was mounted on a winder located within a vacuum evaporation chamber, metallic palladium having a purity of 99% was melted in the chamber in a crucible, under a vacuum of from $1\times10^{-5}$ to $3\times10^{-5}$ Torr. The metallic palladium evaporated onto the polyester film. The winding and running speed of the film was varied to obtain different thicknesses of palladium on the film. The resultant film was removed from the vacuum chamber and after about one day samples of the film were electroless plated using the following treatment bath and conditions.

| Composition of a plating liquid | Concentration (mol/l) |
|---|---|
| $CoCl_2$-$6H_2O$ | 0.04 |
| $NaH_2PO_2$-$H_2O$ | 0.04–0.08 |
| $NH_4Cl$ | 0.2 |
| Citric Acid | 0.08–0.12 |
| $H_3BO_3$ | 0.3–0.5 |
| pH (NaOH) | 8.0 |
| Temperature | 80° C |
| Plating time | 5 minutes |

Immediately after the films were plated they were washed with water and dried. The thickness of the plating on the satisfactory films was about 1,000 A. The smoothness of the surfaces were satisfactory. There were almost no pinholes. The results of this example are shown in Table 1.

Table 1

| Sample No. | Average adhered amount of Pd.(mg/m²) | Adhesion of the plated film to the film (grade) *** | Properties of the film |
|---|---|---|---|
| 1 | 0.32* | 5 | Luster was somewhat poor, with spotted voids on the plated films. |
| 2 | 0.51 * | 8 | Fair to good. |
| 3 | 3.5 * | 9 | Adhesion was excellent and luster was good, the surface being quite smooth. |
| 4 | 10.2 * | 9 | As above. |
| 5 | 115 * | 9 | As above. |
| 6 | 200 ** | 9 | Good. |

* A neutron ray was irradiated onto the adhered palladium and a standard sample of palladium (known amount) inside an atomic pile to produce $Pd^{109}$. The amount of radioactivity ($\beta$ray) produced by the $Pd^{109}$ was measured from a comparison of the value of the said standard sample and the unknown sample the amount of palladium on the unknown sample was obtained.
** The adhesion was evaluated by using "Lumilar" an adhesive tape manufactured by Nitto Denko Co., Ltd. Crosscut peeling tests were carried out. The reported values were assigned as follows

| | |
|---|---|
| Grade 10 | No peeling at all |
| Grade 9 | Occasional raised portion of film, but no film completely peeled from the substrate |
| Grade 8 | Not more than 5% of the plated film was removed |
| Grade 7 | Not more than 10% of the plated film was removed |
| Grade 6 | Not more than 20% of the plated film was removed |
| Grade 5 | Not more than 30% of the plated film was removed |
| Grade 4 | At least 50% of the plated film was removed |
| Grade 3 | At least 80% of the plated film was removed |
| Grade 2 | 100% of the plated film was removed |
| Grade 1 | Plating was easily removed by touching by hand |

Of the obtained plated films, the films of samples Nos. 3 had coercive forces of about 600 oersted, and were useful as magnetic recording tapes. It was found that when these plated films were made into tapes, these tapes could effectively be recorded and recorded and were useful as video tapes.

EXAMPLE 2

Example 1 was repeated except that after evaporating the palladium metal onto the polyester films, the films were plated immediately after they were taken out from the vacuum system at room pressure, room humidity and room temperature and after they were left to stand for 1 hour, 6 hours, 48 hours, 96 hours and one week, 3 months under the same conditions. The results were the same as in Example 1 for all samples.

EXAMPLE 3

Example 1 was repeated except that the polyester film to be plated was subject to a corona discharge treatment under normal conditions at 0.3 A. Thereafter, evaporation of palladium and plating of Co-P were carried out. The adhesions of the plated films of Runs Nos. 1 and 2 was improved by one grade, respectively. When the plated films of Runs Nos. 3–5 were observed in detail, it was found that the delamination of the plated film was decreased.

EXAMPLE 4

A 30 mm × 200 m. long roll of biaxially drawn polyethylene terephthalate film (thickness 25 microns) was mounted on a winder inside a vacuum chamber. Initially the vacuum inside the chamber was maintained at a high vacuum of $5\times10^{-6}$ Torr. Thereafter argon gas was introduced which reduced the vacuum to $1\times10^{-3}$–$1\times10^{-2}$ Torr. A palladium metal plate the thickness of which is 0.5 mm was used as the cathode. The polyester film which is between the cathode and anode was advanced by sliding on the surface of anode. The palladium metal sputtered onto the film. As shown in Table 2, the running speed of said film was being varied to vary the amount of palladium deposited.

The sputtered films were removed from the vacuum chamber. After a lapse of about one day the films were electroless plated as in Example 1.

In the satisfactory sample (Nos. 7–11), the thicknesses of the plated films were about 1,000 A, and the surface smoothness varied only 0.1–0.05 microns which resulted in a smooth film. The results are shown in Table 2.

| Sample No. | Average adhered amount of Pd Pd (mg/m²) | Adhesion of the plated film to the film (grade) ** | Properties of the plated film |
|---|---|---|---|
| 7 | 0.30 * | 7 | Luster was somewhat poor, with slightly spotted voids on the plated film. |
| 8 | 0.52 * | 9 | Fair to good, being slightly better than by the evaporation method. |
| 9 | 3.8 * | 10 | Adhesion and luster was good, and the plating was smooth. |
| 10 | 11.0 * | 10 | As above. |
| 11 | 105 * | 10 | As above. |

(* and ** see Example 1).

Of the obtained plated films, the films of samples Nos. 7 - 11 had coercive forces of about 600 oersted and fewer pinholes than sample obtained in Example 1, especially the films of samples Nos. 9–11. Hardly any pinholes could be found in the films of samples Nos. 9–10. These films were found to be very useful as magnetic recording tapes. It was found that when these films were made into tapes, the tapes were highly effective as video tapes.

EXAMPLE 5

Example 4 was repeated except that after sputtering the palladium metal on the polyester films the films were plated immediately after they were removed from the vacuum chamber at room temperature, room pressure and room humidity. After this, they were left to stand for 1 hour, 6 hours, 48 hours, 96 hours, and one week, 3 months under the same conditions. The results were the same as that obtained in Example 4.

EXAMPLE 6

Example 4 was repeated except that nitrogen gas was sealed inside the vacuum chamber to carry out a ion bombardment treatment of said film at a ratio of 0.1 mA/cm². Thereafter sputtering of palladium and plating of Co–P was carried out as in Example 4. The adhesion of the plated film of sample No. 7 was increased to grade 8 and that of the plated film of Run No. 8 was increased to grade 10.

EXAMPLE 7

Example 4 was repeated except that besides the bipolar sputtering; tripolar sputtering and high frequency sputtering were carried out. However, the results were not greatly different and were satisfactory.

EXAMPLE 8

2 mm thick aluminum plates having surfaces which were ground smooth and cleaned, and oxidized to $Al_2O_3$ were separately plated with palladium using vacuum evaporation and sputtering in accordance with Example 1 and Example 2. The evaporation and sputtering times were controlled by a cover mask. Each of the resulting plates were similarly plated. The amounts of palladium adhered was about 0.5–200 mg/m². Adhesions of grades 9–10 were obtained with the platings, as a whole, being quite satisfactory.

These plated aluminum plates were found to be useful as magnetic disks.

EXAMPLE 9

Example 4 was repeated except an about 100-micron thick polyimide film was used as the substrate. This film was sputtered and thereafter subjected to electroless plating of copper under the following conditions.

| | |
|---|---|
| $CuSO_4 \cdot 5H_2O$ | 10g/liter |
| $NiCl_2 \cdot 6H_2O$ | 2g/liter |
| NaOH | 10g/liter |
| 37% Formalin | 40g/liter |
| $K \cdot Na(C_4H_4O_6) \cdot 4H_2O$ | 30g/liter |
| $Na_2CO_3$ | 20g/liter |
| Water | 1 liter |

Immersed at 20° C for 20 minutes.

The amount of adhered palladium was 3–200 mg/m². The adhesions were grades 9–10 and the plating was good.

It was possible to apply a photoresist coating to the plated film to make a pattern and then etch the copper to make a flexible printed circuit.

EXAMPLE 10

Example 1 was repeated except an epoxy consisting of diglycidylether of bisphenol A and a polyamide hardener was applied to the polyester film to a thickness of about 0.2 micron. After the epoxy was sufficiently cured, the coating procedure of Example 1 was applied to the epoxy coated polyester. The respective adhesions of the plating was increased by an average of one grade.

EXAMPLE 11

A mask, obtained by punching and cutting the electric conductive passage following the pattern of the printed circuit, was closely contacted to a 100$\mu$ m thick biaxially drawn polyethylene terephthalate film. This film was plated under a vacuum of $10^{-5}$ Torr with palladium metal evaporated from a water-cooled crucible using electron bombardment heating of the polyethylene terephthalate film through the open portion of said mask. The average evaporation thickness of palladium was 0.5 A, 2 A, 4 A, 10 A, and 20 A.

The evaporated films were subjected to an electroless plating of copper as described in Example 9 to provide the pattern type electric conductive passages which have the same function as a printed circuit. This method is especially useful because the alkali etching step normally carried out before the sensitizing step in conventional chemical plating process is not required. Accordingly, the surface of the substrate does not become rough and there was no adhesion of alkali. The surface resistance value of the film of the non-electric conductive portion was very good, being $10^{15}-10^{17}\Omega/\square$ as compared with $10^{10}-10^{12}\Omega/\square$ for material produced by conventional processes. These results were obtained from a sample having a thickness of palladium of 0.5 A. A relatively continuous copper plated film was obtained which had a uniform thickness of 2 A and an adhesive strength of at least 400g/cm width in the pattern areas.

EXAMPLE 12

A 100 mm wide × 300 m long roll of biaxially drawn polyethylene terephthalate film (thickness 25 microns) was mounted on a winder located within a semi-continuous vacuum evaporation chamber. Gold having a purity of 99.9 percent was melted by an induction heating method in a carbon crucible, under a vacuum of $2\times10^{-4}$ Torr. The film was advanced and the gold was evaporated onto the film by periodically stopping the film and allowing it to stand until the desired adhered amount of gold was deposited on the film. The thickness of the adhered amount of gold was varied by changing the running speed of the substrate of polyester film.

The gold evaporated films were placed in the air and subjected to electroless plating under the plating conditions of Example 1.

Immediately after the films were plated, they were washed with water, and then they were dried and measured, the satisfactory films, Nos. 16–19, had a thickness of the plated Co-P films of about 900 A. The surface smoothness varied from 0.1–0.05$\mu$ and number of pinholes were small. The results are shown in Table 3.

Table 3

| Sample No. | Average adhered amt. of gold (mg/m²) | Adhesion of the plated film (grade) *** | Properties of the film |
|---|---|---|---|
| 12 | 1.4 * (0.73 A) | – | Did not completely plate. |
| 13 | 3.8 * (3 A) | – | As above. |
| 14 | 62 * (32 A) | 9 | Plated, but luster was incomplete to some extent. |
| 15 | 135 * (70 A) | 10 | Plating was good, and luster was good. |
| 16 | 944 ** (490 A) | 10 | As above. |
| 17 | 3.80 g/m² (1,920 A) | 10 | As above. |
| 18 | 38 g/m² (1.97$\mu$) | 5 | Had tendency to peel. |

* Heated neutron was irradiated onto the adhered gold together with the standard sample gold (known amount) inside an atomic pile to produce Au 197, and the amount of radioactivity ($\beta$ray) produced from $Au^{197}$ was obtained by a comparison of the value of the sample and the standard sample.

** A sample was immersed in n-porpylamine and heated to dissolve the substrate polyethylene terephthalate film. The thin film of gold was washed with water and dried, and the weight of said film was obtained by weighing it with a microbalance.

*** see procedure of Example 1.

Of the obtained films, the films of Samples Nos. 17–18 had coercive forces of 580 oersted, and here found to be useful as magnetic recording tape.

EXAMPLE 13

Example 12 was repeated except that after evaporating gold on the polyester films, the films were plated immediately after they were taken out into air, and after they were left to stand for 1 hour, 6 hours, 48 hours, 96 hours and 1 week, and 3 months under the same conditions. The results were identical to those of Example 12.

EXAMPLE 14

A 30 mm wide by 200 m long roll of biaxially drawn polyethylene terephthalate film (thickness 25 microns) was mounted inside a semi-continuous bipolar DC sputtering apparatus. The area inside the apparatus was maintained at a vacuum of $5\times10^{-6}$ Torr. Thereafter, argon gas was introduced into the system so that the vacuum now was $5\times10^{-3}$ Torr. A gold plate was used as the cathode. As the anode, a water-cooled copper electrode was employed having a lattice in transverse direction intervals of about 25 mm. At the rear of the anode the film was contacted with a water cooling roll. The thickness of the plated film was changed by varying the running speed of the film and repeated sputtering. The sputtered films were taken out into the air and after lapse of about 2 days, they were subjected to electroless plating under the same conditions as Example 12. The satisfactory samples Nos. 22–24 of Table 4 had a plated film thicknesses of about 900 A. The surface roughnesses were 0.1–0.05$\mu$ and number of pinholes were less than that in Example 12, especially in sample No. 22 pinholes could hardly be found, and these plated films were found to be very useful as magnetic recording film. The results are shown in Table 4.

Table 4

| Sample No. | Average adhered amount of gold (mg/m²) | Adhesion of plated film (grade) *** | Properties of the plated film |
|---|---|---|---|
| 19 | 1.0 * (0.52 A) | — | Only extremely small portions of the film was plated |
| 20 | 5.2 * (2.7 A) | — | Very small portion of the film was plated |
| 21 | 41 * (21.3 A) | 9 | Whole sample was plated, but it lacks luster and overall uniformity. |
| 22 | 150 * (78 A) | 10 | Adhesion, luster and uniformity of plating was good. |
| 23 | 715 * (370 A) | 10 | As above |

Table 4-Continued

| Sample No. | Average adhered amount of gold (mg/m²) | Adhesion of plated film (grade) *** | Properties of the plated film |
|---|---|---|---|
| 24 | 1170 ** (606 A) | 10 | As above |

*, ** were obtained as in Example 1.

Of the obtained plated films, the films of samples Nos. 22–24 had coercive forces of about 580 oersted. The number of pinholes was less than in Example 12 and pinholes were hardly found in the films of samples Nos. 20–23. It was found that these plated films were especially useful as magnetic recording tapes.

EXAMPLE 15

Example 14 was repeated except that after sputtering with gold on the polyester films, the films were taken out into the air. These films were plated immediately and after they were left to stand for 1 hour, 6 hours, 48 hours, 96 hours, and one week under the same conditions. The results were identical to those of Example 14.

In the present invention, the substrate material, as mentioned earlier, may be either organic or inorganic. When an inorganic substrate is used, especially a metal, and particularly a metal having good electric conductivity or when a metal such as Cu, Co, Cr, Al, Zn, Ag, Mn or Sn is vacuum evaporated or sputtered on the surface of an inorganic substrate, especially a synthetic resin prior to application of either palladium or gold, when electroless plating is conducted in accordance with the process of the present invention, a plated film having good adhesion and few pinholes is obtained.

EXAMPLE 16

A 10 mm × 200 m. roll of biaxially drawn polyethylene terephthalate film (thickness 25 microns) was mounted on a winder inside a vacuum evaporation chamber, and copper having a purity of 99.9 percent was melted by an induction heating method in a crucible and continuously evaporated onto the polyethylene terephthalate film so that the surface resistance was about $0.1 - 100\Omega/\square$ at a vacuum of $1 \times 10^{-5}$ Torr. The film was removed from the vacuum chamber and thereafter, using the same apparatus, palladium having a purity of 99.9 percent was intermittently evaporated on said film to various thicknesses under vacuum of $1\times10^{-5}$ Torr.

The resulting films were taken out of the vacuum chamber and after lapse of about 1 hour, they were subjected to electroless plating under the plating conditions disclosed in Example 1.

After the plating, the plated films were washed with water, dried and measured. The thickness of the plated films, insofar as the films could be plated, were about 1000 A with no pinholes. The results are shown in Table 5.

Table 5

| Sample No. | Surface resistance of the film evaporated with Cu / | Average adhered amount of Pd mg/m² *1 | Area adhered with Pd % *2 | Possibility of plating |
|---|---|---|---|---|
| 25 | 0.1 | 0.03 | 100 | Could not be plated |
| 26 | 0.2 | 0.05 | 100 | Could be easily plated |
| 27 | 0.1 | 0.35 | 100 | As above |
| 28 | 0.2 | 1.02 | 100 | As above |
| 29 | 0.1 | 124 | 100 | As above |
| 30 | 1.0 | 124 | 100 | As above |

*1 A neutron ray was irradiated onto the adhered palladium and the standard sample Pd (known amount) inside an atomic pile to produce $Pd^{100}$. The amount of radioactivity (βray) produced from $Pd^{109}$ was measured from comparison of the value of the sample and the standard.

*2 An adherance of Pd to the entire surface on the surface of the electric conductive metal was given a value of 100 (%).

Table 6

| Sample No. | Surface resistance of the film evaporated with Cu Ω/□ | Average adhered amount of Pd mg/m² | Area adhered with Pd % | Possibility of plating |
|---|---|---|---|---|
| 31 | 0.1 | 0.02 | 100 | Could not be plated |
| 32 | 0.1 | 0.03 | 100 | Could be plated |
| 33 | 0.1 | 52.1 | 100 | As above |
| 34 | 0.1 | 780 | 100 | As above |

EXAMPLE 17

Example 16 was repeated except that after evaporation of Pd on the polyethylene terephthalate films, the films were stored in dry air at room pressure and room temperature for 24 hours, 96 hours, 168 hours and 720 hours. Thereafter, when they were taken out and plated under the same conditions, the results were identical to those of Example 16.

EXAMPLE 18

A 100 mm wide and 200 m. long biaxially drawn polyethylene terephthalate film (thickness 25 microns) was mounted on a winder inside a vacuum evaporation machine. Copper having a purity of 99.9 percent was evaporated onto the film by an induction heating method at a degree of vacuum of $1-3\times10^{-5}$ Torr so that the surface resistance might become 0.1Ω/□. Inside a separate sputtering apparatus. a degree of vacuum of which was produced of $1\times10^{-5}$ Torr. Thereafter, argon was introduced so that the degree of vacuum was $1\times10^{-2}$ Torr. Palladium having a purity of 99.9 percent was sputtered on the resultant film to various thicknesses.

The obtained films were plated with a plating liquid as in Example 16. Immediately after plating, these films were washed with water, dried and measured, the thicknesses of the films was about 1000 A and there were hardly any pinholes. The results are shown in Table 6.

We claim:

1. A process of making a magnetic recording media consisting essentially of a non-magnetic carrier and a thin magnetic metal film thereon, said process essentially comprising depositing a thin film of pure palladium metal on a non-magnetic carrier substrate by sputtering from a palladium metal source until the amount of palladium deposited on said substrate is in the range of 0.5–200 milligrams per square meter, thereafter electrolessly plating a magnetic metal on said substrate over said deposited palladium in the presence of said palladium as a catalyst.

2. The process according to claim 1 wherein said magnetic recording media is a magnetic recording tape or a magnetic recording disc.

3. The process according to claim 1 wherein pattern type deposition of palladium on said substrate is electrolessly plated with a magnetic metal to obtain a pattern type magnetic metal plated article.

4. The process according to claim 1 wherein the said magnetic metal is cobalt.

5. The electroless plating process according to claim 1 wherein said substrate is an organic substrate, an inorganic substrate or a composite thereof and is an electrical insulator, electrical semi-conductive or electrical conductive.

* * * * *